United States Patent [19]

Hull

[11] Patent Number: 4,462,204
[45] Date of Patent: Jul. 31, 1984

[54] GAS TURBINE ENGINE COOLING AIRFLOW MODULATOR

[75] Inventor: Peter R. Hull, Ipswich, Mass.

[73] Assignee: General Electric Company, Lynn, Mass.

[21] Appl. No.: 401,173

[22] Filed: Jul. 23, 1982

[51] Int. Cl.³ .............................................. F02C 7/12
[52] U.S. Cl. .................... 60/39.07; 415/115
[58] Field of Search .......... 60/39.07, 751, 39.75; 415/115, 116, 117

[56] References Cited

U.S. PATENT DOCUMENTS

| | | | |
|---|---|---|---|
| 2,896,906 | 7/1959 | Durkin | 415/115 |
| 2,940,258 | 6/1960 | Lombard et al. | 184/6.11 |
| 3,301,526 | 1/1967 | Chamberlain | 415/115 |
| 3,452,542 | 7/1969 | Saferstein et al. | 415/115 |
| 3,726,604 | 4/1973 | Helms et al. | 415/115 |
| 3,826,084 | 7/1974 | Branstrom et al. | 415/115 |
| 3,864,056 | 2/1975 | Gabriel et al. | 415/178 |
| 3,972,181 | 8/1976 | Swayne | 415/115 |
| 4,069,662 | 1/1978 | Redinger et al. | 60/226.1 |
| 4,213,738 | 7/1980 | Williams | 416/95 |
| 4,296,599 | 10/1981 | Adamson | 60/39.23 |

*Primary Examiner*—Louis J. Casaregola
*Attorney, Agent, or Firm*—Francis L. Conte; Derek P. Lawrence

[57] ABSTRACT

The invention is a cooling airflow modulation system for use on gas turbine engines. The system utilizes one or more circumferential manifolds for collecting and providing a source of high-pressure cooling air to hot turbine parts. The cooling air is directed to the manifolds through valved passageways that collect compressor discharge air and direct that air radially inwardly and axially downstream to manifold locations. Multiple passageways aand manifolds provide a means for maintaining pressure in the hot turbine parts while cooling airflow volume is being modulated through selected manifold and passageway combinations.

4 Claims, 3 Drawing Figures

GAS TURBINE ENGINE COOLING AIRFLOW MODULATOR

BACKGROUND OF THE INVENTION

1. Field of the Invention

This invention relates to turbine cooling air systems for use in gas turbine engines.

2. Summary of the Prior Art

As turbine inlet temperatures have been increased in order to improve the efficiency of gas turbine engines, it has become necessary to provide cooling air to the turbine blades and vanes in order to limit the temperatures of those components to levels that can be withstood by the materials used to make those components. At higher operating temperature conditions, such as take off when the engines are used to power airplanes, the amount of cooling air that is required is relatively high. In contrast, during lower temperature operating conditions, such as at idle, there is relatively little, if any, cooling air required for the turbine components. In spite of these very different operating conditions, for reasons of simplicity and safety, it has not generally been considered desirable to modulate the flow of cooling air to the turbine components. As a result, since the engine must be designed so as to provide the amount of cooling airflow required for maximum temperature operation, an excessive amount of cooling air is provided during other operating conditions which tends to reduce the efficiency of the engine during those operating periods. The excess flow at these conditions is wasteful resulting in poor performance and higher fuel consumption than would be the case if this flow could be reduced to the minimum amount required for each particular operating condition.

In response to this efficiency problem, various concepts have been proposed and studied for controlling or modulating the turbine cooling flow thus eliminating these unnecessary performance losses. The systems have generally been comprised of flow modulating valves or devices somewhere in a series of flow areas from source to sink. Many of the systems have been quite complex with many moving parts installed substantially internally within the engine and thus have been relatively inaccessible for inspection, adjustment or servicing. Many of these complex systems are also subject to reliability problems, such as binding or jamming, especially since they must often operate in hot and inaccessible areas which preclude or make difficult part lubrication or servicing.

It is therefore, an object of the present invention to provide an improved modulated cooling system for a gas turbine engine.

It is another object of the present invention to provide an improved cooling system for a gas turbine engine that includes a modulating system with an external actuator for easy access and service.

It is another object of the present invention to provide an improved cooling system for a gas turbine engine with cooling flow modulation using a structurally uncomplicated configuration that avoids excessive pressure losses.

These and other objects and features of the invention will become more readily apparent upon reference to the following description.

SUMMARY OF THE INVENTION

In one embodiment of the invention, there is provided a cooling airflow modulation system comprising a circumferential manifold for collecting and providing a source of high-pressure cooling air for a rotating turbine section of the engine. Modulation of the cooling airflow into the turbine section is accomplished by modulating sources of compressor discharge air that flows into the circumferential manifold. The compressor discharge air is physically directed through one or more local passageways that have inlet ports located close to compressor discharge so that compressed air exiting the compressor section can flow continuously into the passageways. The passageways are configured to direct the relatively cool compressor discharge air radially inwardly and thereafter axially downstream to the manifold location. Valve means are provided near the inlet ports of one or more of these passageways for modulating the flow of cooling air therethrough. This modulation will control the supply of air to the manifold. The valve means are actuated in response to engine operating conditions to provide appropriate amounts of cooling airflow to the turbine blades of the engine during varying engine operational conditions.

DESCRIPTION OF THE DRAWINGS

While the specification concludes with the claims distinctly claiming and particularly pointing out the invention described herein, it is believed that the invention will be clearly understood by reference to the discussion below in conjunction with the following drawings.

DESCRIPTION OF THE PREFERRED EMBODIMENT

Figure 1:
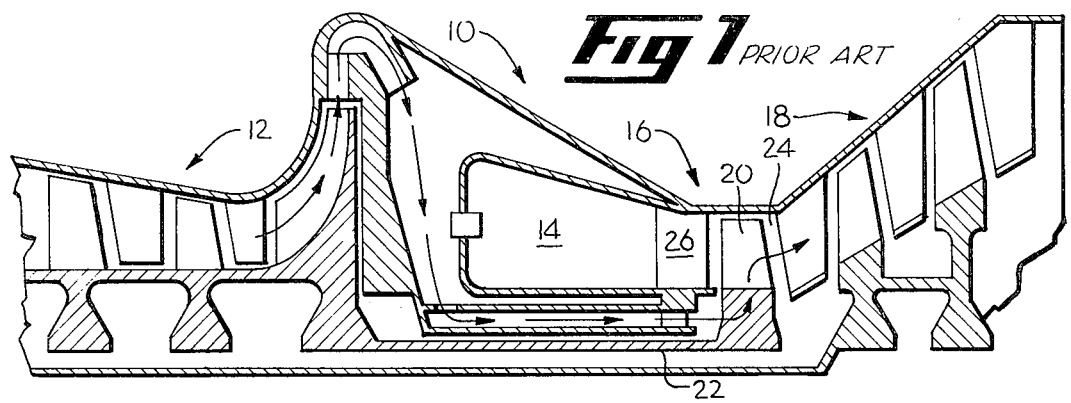
FIG. 1 is a schematic cross-sectional illustration of a portion of a prior art gas turbine engine embodying a typical turbine cooling air system.

Referring now to FIG. 1, a portion of a prior art gas turbine engine is shown generally at 10 having disposed in serial flow relationship a compressor 12, a combustor 14, a high-pressure turbine 16, and a low-pressure turbine 18. In conventional operation, the inlet air is pressurized by the compressor 12 whereafter it passes to the general region of the combustor 14. Most of this compressed air is passed into the combustor 14 where it is mixed with fuel and ignited to form high-temperature, high-pressure gases that flow into the high-pressure turbine 16 causing individual turbine blades 20 to rotate thereby providing means to transfer mechanical power to the compressor 12 through a shaft 22. The high-pressure turbine discharges these gases through a downstream flowpath 24 to the low-pressure turbine 18 where the gases again cause turbine blades to rotate thereby providing means to transfer mechanical power to a fan, output shaft, or the like (not shown). The gases discharged from the low-pressure turbine 18 are then directed out of the gas turbine engine 10 through an exhaust duct or nozzle (not shown).

A portion of the compressor discharge air entering the general region of the combustor 14 is circulated to cool hot parts of the turbine engine 10. Some of that air which surrounds the combustor 14 enters walls of the combustor to cool the inner surfaces thereof by way of convection and/or film cooling processes. Other portions of that air are directed to enter first-stage turbine vanes 26 so as to provide a cooling function by an impingement and diffusion process. Still other parts of the compressor discharge air are directed along the paths, as shown by arrows in FIG. 1, to cool the turbine blades 20 of the high-pressure turbine 16.

It should be recognized that during high-power modes of operation, high-temperature operating conditions prevail and a substantial amount of cooling air is needed for cooling hot turbine parts. However, there are other modes of engine operation wherein lesser amounts of cooling air are required. There can be even be certain modes of engine operation where no cooling air is required. It is the intent and purpose of the present invention to modulate the cooling airflow in order to accommodate engine cooling needs while, at the same time, economizing use of cooling air whenever possible in order to increase the efficiency of the engine.

Figure 2:
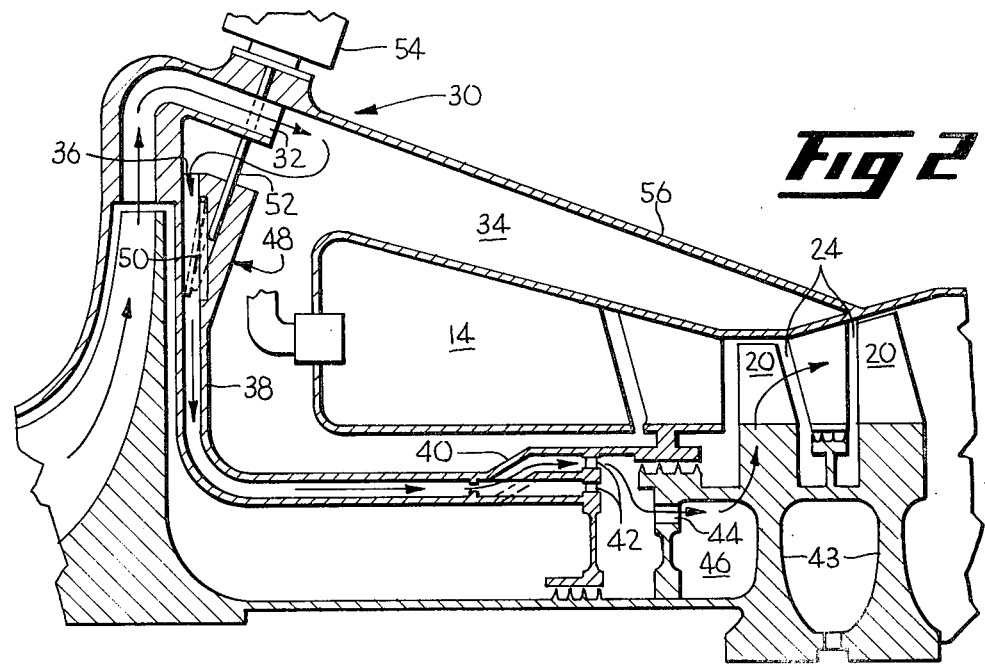
FIG. 2 is a schematic cross-sectional illustration of a portion of a gas turbine engine incorporating an embodiment of the present invention.

Referring now to FIG. 2, one embodiment of the cooling airflow modulation system 30 of the present invention is shown in a portion of a gas turbine engine. The system shown is incorporated into an engine that utilizes a centrifugal compressor with an outlet 32 positioned radially outwardly of the combustor 14. The compressor supplies high-pressure compressor discharge air to a region 34 surrounding the combustor. Again, as stated earlier, a major portion of this compressor discharge air is directed into the combustor 14 to support the combustion processes occurring inside the combustor.

One or more inlet ports 36 to the modulation system 30 are located radially outwardly of the combustor 14 and upstream of the compressor outlet 32 for the purpose of preventing sand or dirt particles in the compressor discharge air from directly entering the inlet ports 36 of the system. Preventing induction of dirt particles can be very important because the cooling air entering the system is utilized to cool turbine blades having extremely small cooling air passages. If any dirt is entrained in the system, it can tend to block these cooling air passages which can hinder the cooling process causing damage to hot turbine parts.

The inlet ports 36 direct compressor discharge air into corresponding cooling system ducts 38. It shall be appreciated that any number of inlet ports 36 with corresponding ducts 38 can be provided in the engine generally depending upon the size of the ducts and the design requirements of the engine. Each duct 38 directs the compressor discharge air radially inwardly at a location upstream of the combustor 14, and thereafter axially downstream within the engine towards the general region of the high-pressure turbine 16.

Before entering the turbine section, the cooling air is collected in 360 degree circumferential manifolds 40, which serve as a source of high-pressure cooling air for internal cooling of the turbine section. From this source, a stream of cooling air is directed through tangential flow accelerators 42 in the direction of a rotating turbine rotor 43. The cooling air flows through inlet holes 44 to enter a rotor cooling plate chamber 46. From this chamber 46, the air is distributed radially outwardly into interior sections of the turbine blades 20. The airflow cools the turbine blades 20 and exits through turbine blade cooling holes into the turbine flow path 24.

The accelerators 42 provide tangential flow acceleration to a velocity level that closely matches that of the turbine rotor cooling flow inlet holes 44 to increase the static pressure in cooling plate chamber 46 relative to the turbine rotor, thus increasing turbine blade internal pressure. Sufficient pressure level in the blades 20 is necessary to prevent cooling flow reversal and ingestion of hot exhaust gas into the blades, also known as back-flow.

The reader will appreciate that there are two circumferential manifolds 40 shown in FIG. 2. A predetermined number of multiple air ducts 38 will supply air to a single manifold 40, and these predetermined air ducts will also be provided with valve means 48 located just downstream of the inlet port 36. The valve means 48 are provided for the purpose of modulating airflow through those predetermined air ducts 38 thereby modulating the cooling airflow into one of the manifolds 40, and therefore, to one of the accelerators 42. The advantages of this arrangement will be described later in this specification.

Any of a wide variety of valve configurations might comprise the valve means 48. Some examples of potential devices including a plug-type valve, a butterfly-type valve or a flapper valve as is shown in FIG. 2.

The flapper valve shown comprises a pivoting flap 50 that can be rested against a wall of the duct 38, thereby leaving the duct open. To close the flap valve, an actuator arm 52 is extended thereby causing the flap to pivot to the position indicated by a dashed outline, thereby closing the air duct 38.

The actuator arm 52 is extended and retracted by an external actuation device 54 which might be a mechanical, electric, pneumatic, hydraulic, or any of several other types of actuation devices. While it is not particularly important what type of actuator device is utilized, it is very helpful if the device 54 is located externally of the engine skin or casing 56. This permits easy access to the actuator 54, for example, to service the actuator. Locating the actuator externally also prevents the actuator from being exposed to hot temperatures within the combustor region 34 of the engine. It is also relatively simple to extend whatever control means are necessary to the actuator 54 in order to operate the actuator appropriately during different modes of engine operation.

As stated earlier, the cooling airflow modulation system embodiment shown in FIG. 2, incudes two 360 degree manifolds 40 provided adjacent to each other, one on top of the other. In the embodiment shown, each of these two manifolds is directly connected to one or more corresponding air ducts 38. This type of arrangement provides an inherent advantage in that when certain predetermined air ducts 38 are closed by valve means 48, the remaining air ducts 38 remain open to an unmodulated manifold 40. The unmodulated manifold connected to the open air ducts 38 remains relatively unaffected by any pressure loss that might be caused by the closed valves.

This arrangement of individual duct and manifold combinations preserves a normal full pressure level to the open air duct and manifold combinations, resulting in full pressure ratio across the unmodulated tangential accelerator and full flow acceleration and higher pressures in the cooling air chamber 46 and in the turbine blades 20. As indicated earlier, the higher pressure is necessary to maintain back-flow margin across the blade 20. This back flow margin prevents hot gases in the turbine section from flowing into the blade 20 during turbine operation.

Modulating the flow to all of the manifold and accelerator combinations would reduce the pressure ratio across the accelerator, the tangential velocity of the air exiting from the accelerator, and, ultimately, would reduce the air pressure in the blades 20.

Thus, the use of two accelerators 42, manifolds 40 and ducts 38 with modulation of only one duct, manifold and accelerator combination preserves full pressure ratio across the unmodulated accelerator to avoid blade pressure loss. This allows greater reductions in cooling airflows while maintaining the sufficient back-flow margin. It shall be appreciated that the number of total manifolds 40 and the number of manifolds that correspond to unmodulated accelerators 42 can be varied.

It shall also be appreciated that the selection of duct inlet locations upstream from the compressor outlet 32 as presented herein provides for relatively clean cooling air pickup, as the momentum of particles entrained in compressor discharge air causes them to follow a trajectory which bypasses the duct inlets 36. The close proximity of the duct inlets 36 to the engine external skin also allows for external mounting of the systems actuator 54 and all moving parts thus providing better reliability, simplicity and maintainability.

Figure 3:
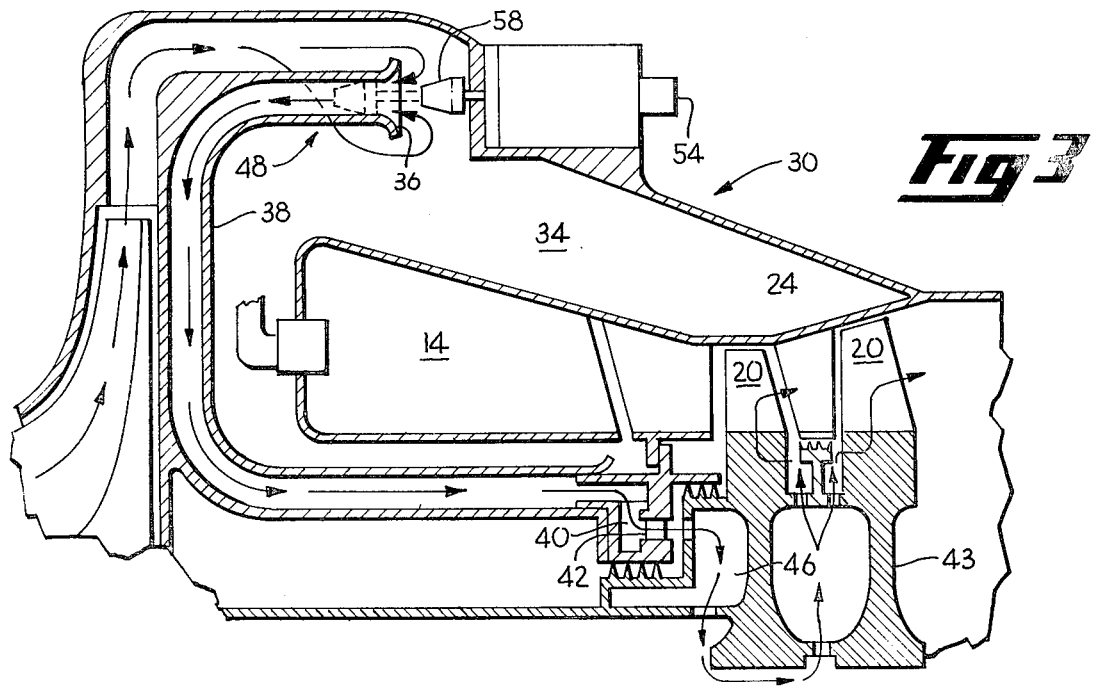
FIG. 3 is a schematic cross-sectional illustration of a portion of a gas turbine engine with an alternate embodiment of the present invention incorporated therein.

Referring now to FIG. 3, an alternate embodiment of the cooling airflow modulation system 30 is shown. Again, the engine utilizes a centrifugal compressor discharging compressor discharge air to a region 34 surrounding a combustor 14.

The compressor discharge air enters an air duct 38 through an inlet port 36. The airflow into this inlet port 36 is controlled by a protruding plug valve 58 which can be actuated by any of a variety of types of actuators 54.

Again, the cooling air is directed by the air duct 38 radially inwardly and thereafter axially downstream towards the general region of the turbine section. In the embodiment shown in FIG. 3, the cooling air enters a single 360 degree circumferential manifold 40 where the air is collected before it is directed through a tangential accelerator 42 into the rotating turbine section.

While the present invention has been disclosed with particular reference to a preferred and a modified embodiment thereof, the concepts of this invention are readily adaptable to other embodiments, and those skilled in the art may vary the structure without departing from the scope of the present invention. For example, while the invention has been described in terms of directing the flow of cooling air to rotating high-pressure turbine components, it may also be employed for use in cooling other rotating or static areas of a gas turbine engine. Other variations will also occur to those skilled in the art. It is contemplated that such variations are within the scope of the appended claims.

What is claimed as new and novel and desired to be secured by Letters Patent of the United States is as follows:

1. In a gas turbine engine including a centrifugal compressor, a combustor, and a turbine section being coaxially disposed in an engine casing, said compressor being disposed forward of said combustor and said turbine section being disposed aft of said combustor, said compressor being effective for supplying compressor discharge air for cooling said turbine section, a system for modulating said cooling air to said turbine section comprising:

an outlet of said compressor disposed radially outwardly with respect to said combustor and facing in an aft direction;

a duct having a first and second ends, said first end being disposed radially outwardly of said combustor and said second end being disposed radially inwardly thereof, and an inlet port disposed at said first end and forward of said compressor outlet;

a manifold disposed in flow communication with said second end of said duct for collecting cooling air discharged therefrom for providing a source of cooling air for cooling said turbine section;

a tangential flow accelerator disposed in flow communication with said manifold and effective for directing said cooling air to said turbine section; and valve means effective for modulating flow of said cooling air in said duct and including an actuator disposed radially outwardly of said casing, an actuator arm extending from said actuator through said casing, and a valve positionable in said duct for modulating airflow therethrough and being operatively connected to said actuator arm.

2. A cooling air modulation system according to claim 1 wherein said valve comprises a plug valve positionable in said inlet port.

3. A cooling air modulation system according to claim 1 wherein said valve comprises a flapper valve positionable in said duct.

4. A cooling air modulation system according to claim 1 wherein:

said turbine section further includes a plurality of turbine blades and a chamber effective for receiving cooling air for distribution to said turbine blades;

said duct comprises first and second parallel flow ducts;

said manifold comprises first and second, parallel flow, circumferential manifolds;

said tangential flow accelerator comprises first and second, parallel flow, circumferential tangential flow accelerators disposed in flow communication with said chamber of said turbine section; and said valve means is effective for modulating airflow only to said first duct, first manifold, and first tangential flow accelerator, said second duct, second manifold, and second tangential flow accelerator being effective for channeling without restriction flow from said compressor to said turbine section.

* * * * *